United States Patent
Kato et al.

(10) Patent No.: US 7,104,919 B2
(45) Date of Patent: Sep. 12, 2006

(54) TOROIDAL-TYPE CONTINUOUSLY VARIABLE TRANSMISSION

(75) Inventors: Hiroshi Kato, Kanagawa (JP); Hirotoshi Aramaki, Kanagawa (JP); Shinichi Natsumeda, Kanagawa (JP)

(73) Assignee: NSK Ltd., Tokyo (JP)

( * ) Notice: Subject to any disclaimer, the term of this patent is extended or adjusted under 35 U.S.C. 154(b) by 510 days.

(21) Appl. No.: 10/649,726

(22) Filed: Aug. 28, 2003

(65) Prior Publication Data

US 2004/0102285 A1    May 27, 2004

(30) Foreign Application Priority Data

Aug. 29, 2002  (JP)  ............ P.2002-250419

(51) Int. Cl.
  *F16H 15/38*  (2006.01)
(52) U.S. Cl. ............ 476/42; 476/40; 476/46; 384/470; 384/614
(58) Field of Classification Search ............ 476/40, 476/42, 46; 384/470, 614
  See application file for complete search history.

(56) References Cited

U.S. PATENT DOCUMENTS

| | | | | |
|---|---|---|---|---|
| 4,955,246 A | * | 9/1990 | Nakano | 476/46 |
| 5,015,105 A | * | 5/1991 | Ueno | 384/531 |
| 5,391,126 A | | 2/1995 | Fukushima et al. | |
| 6,083,137 A | * | 7/2000 | Kato et al. | 476/8 |
| 6,368,245 B1 | | 4/2002 | Goto et al. | |
| 6,749,343 B1 | * | 6/2004 | Kato et al. | 384/614 |
| 6,800,046 B1 | * | 10/2004 | Nogi et al. | 476/40 |

FOREIGN PATENT DOCUMENTS

| | | |
|---|---|---|
| JP | 62-71465 U | 5/1987 |
| JP | 6-16753 U | 3/1994 |
| JP | 11-118011 A | 4/1999 |
| JP | 2000-220711 A | 8/2000 |
| JP | 2001-50360 | 2/2001 |
| JP | 2001-254792 A | 9/2001 |

* cited by examiner

*Primary Examiner*—David Fenstermacher
(74) *Attorney, Agent, or Firm*—Sughrue Mion, PLLC

(57) ABSTRACT

A toroidal-type continuously variable transmission, has: first and second disks; a plurality of trunnions; a plurality of displacement shafts respectively supported on associated trunnions; a plurality of power rollers respectively interposed between the first and second disks; and, a plurality of thrust bearings respectively interposed between the power rollers and trunnions, each of the thrust bearings including an outer ring, an inner raceway formed in the outer end face of the power roller, a plurality of rolling elements, and a circular-ring-shaped retainer, wherein, in case where the density of a retainer material constituting the retainer is $\rho_d$, the elastic modulus of the retainer material is $E_d$, the density of rolling element materials is $\rho_c$ and the elastic modulus of the rolling element materials is $E_c$, $$\{(\rho_d \cdot E_d)/(\rho_c \cdot E_c)\}^{\frac{1}{2}} \leq 0.6$$

is satisfied.

1 Claim, 5 Drawing Sheets

TOROIDAL-TYPE CONTINUOUSLY VARIABLE TRANSMISSION

BACKGROUND OF THE INVENTION

1. Field of the Invention

A toroidal-type continuously variable transmission according to the present invention is used, for example, as a transmission unit for a transmission for a car, or as a transmission for various industrial machines.

2. Description of the Related Art

Figure 1:
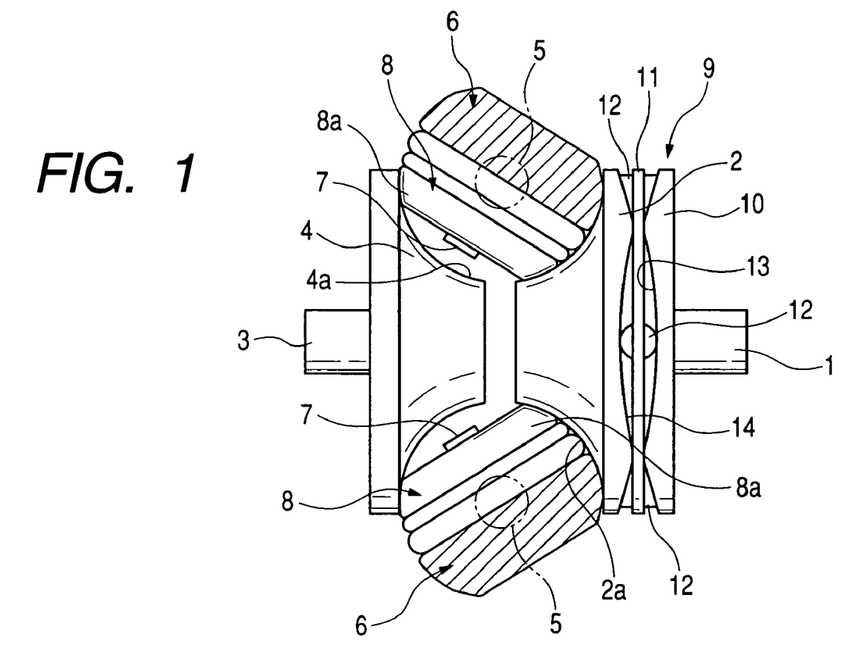
FIG. 1 is a side view of the basic structure of a conventionally known toroidal-type continuously variable transmission, showing a state in which it is in the maximum speed reducing time.
Figure 2:
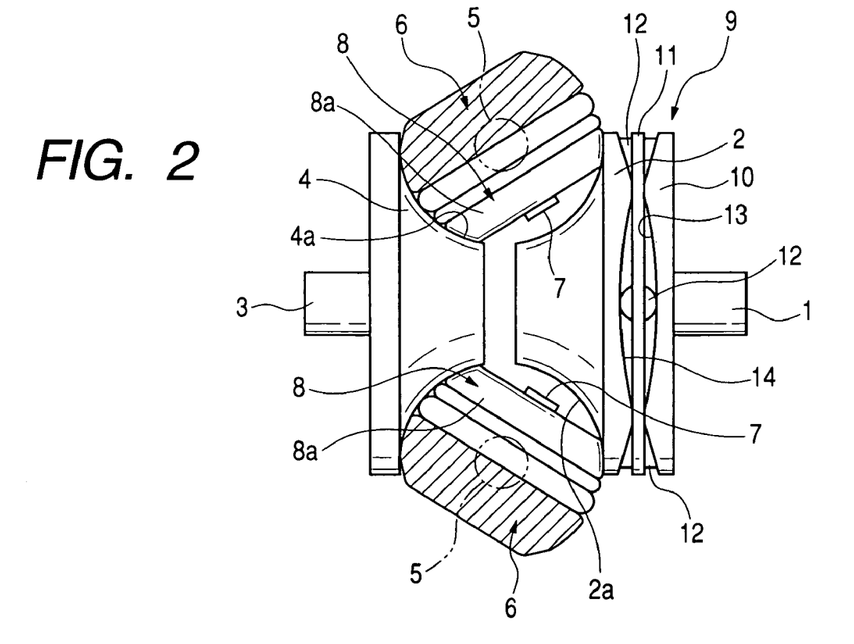
FIG. 2 is a side view of the above conventional toroidal-type continuously variable transmission, showing a state in which it is in the maximum speed increasing time.

Conventionally, use of such a toroidal-type continuously variable transmission as is roughly shown in FIGS. 1 and 2, and as a transmission for a car has been studied and also such use has been practically enforced in part of the car industry. In the case of this conventional toroidal-type continuously variable transmission, as disclosed in e.g. JP-UM-A-62-71465, an input side disk 2 serving as a first disk is supported concentrically with an input shaft 1 and, to the end portion of an output shaft 3 which is disposed concentrically with the input shaft 1, there is fixed an output side disk 4 serving as a second disk. In the interior of a casing in which the toroidal-type continuously variable transmission is stored, there are disposed trunnions 6, 6 which can be swung about their associated pivot shafts 5, 5 provided at such positions that do not cross the center axes of the input shaft 1 and output shaft 3 but are twisted at right angles or in a direction near to right angles with respect to the direction of these center axes.

That is, the pivot shafts 5, 5 are disposed on the outer surfaces of the two end portions of their associated trunnions 6, 6 in such a manner that the pivot shafts 5, 5 are concentric with each other. Also, on the middle portions of the trunnions 6, 6, there are supported the base half sections of their associated displacement shafts 7, 7; and, by swinging the trunnions 6, 6 about their associated pivot shafts 5, 5, the inclination angles of the displacement shafts 7, 7 can be adjusted freely. On the peripheries of the front half sections of the displacement shafts 7, 7 supported on the trunnions 6, 6, there are rotatably supported their associated power rollers 8, 8, respectively. And, the power rollers 8, 8 are respectively held by and between the mutually opposing inner surfaces 2a, 4a of the input side and output side disks 2, 4. And, the section of each of the inner surfaces 2a, 4a is formed as a concave-shaped surface which can be obtained by rotating an arc with the pivot shaft 5 as a center thereof or a curved line near to such arc around the center axes of the input shaft 1 and output shaft 3. And, the peripheral surfaces 8a, 8a of the power rollers 8, 8, which are formed as spherically-convex-shaped surfaces, are contacted with the inner surfaces 2a, 4a.

Between the input shaft 1 and input side disk 2, there is interposed a pressing device 9 of a loading cam type and, using this pressing device 9, the input side disk 2 can be elastically pressed toward the output side disk 4. The pressing device 9 is composed of a cam plate 10 rotatable together with the input shaft 1 and a plurality of (for example, four) rollers 12, 12 which are rollably held by a retainer 11. In one side surface (in FIGS. 1 and 2, the left side surface) of the cam plate 10, there is formed a drive-side cam surface 13 which is an uneven surface with respect to the circumferential direction of the cam plate 10; and, in the outer surface (in FIGS. 1 and 2, the right side surface) of the input side disk 2 as well, there is formed a driven-side cam surface 14 having a similar shape to the drive-side cam surface 13. And, the plurality of rollers 12, 12 are supported in such a manner that they can be rotated about their radial-direction axes with respect to the center of the input shaft 1.

When the above-structured toroidal-type continuously variable transmission is in operation, in case where the cam plate 10 is rotated as the input shaft 1 is rotated, the drive-side cam surface 13 presses the plurality of rollers 12, 12 against the driven-side cam surface 14 formed in the outer surface of the input side disk 2. As a result of this, the input side disk 2 is pressed against the plurality of power rollers 8, 8 and, at the same time, due to the mutual pressing operation between the drive-side, driven-side cam surfaces 13, 14 and the plurality of rollers 12, 12, the input side disk 2 is rotated. And, the rotational power of the input side disk 2 can be transmitted through the plurality of power rollers 8, 8 to the output side disk 4, so that the output shaft 3 fixed to the output side disk 4 can be rotated.

Now, description will be given here of a case where the rotation speed ratio (transmission ratio) between the input shaft 1 and output shaft 3 is to be changed. Firstly, to reduce the speed between the input shaft 1 and output shaft 3, the trunnions 6, 6 may be swung in a given direction about their associated pivot shafts 5, 5. And, the displacement shafts 7, 7 may be inclined in such a manner that the peripheral surfaces 8a, 8a of the power rollers 8, 8, as shown in FIG. 1, can be contacted with the near-to-center portion of the inner surface 2a of the input side disk 2 and the near-to-outer-periphery portion of the inner surface 4a of the output side disk 4. On the other hand, to increase the speed between the input shaft 1 and output shaft 3, the trunnions 6, 6 may be swung in the opposite direction about their associated pivot shafts 5, 5. And, the displacement shafts 7, 7 may be inclined in such a manner that the peripheral surfaces 8a, 8a of the power rollers 8, 8, as shown in FIG. 2, can be contacted with the near-to-outer-periphery portion of the inner surface 2a of the input side disk 2 and the near-to-center portion of the inner surface 4a of the output side disk 4. By the way, in case where the inclination angles of these displacement shafts 7, 7 are set at intermediate angles between the angles shown in FIGS. 1 and 2, there can be obtained an intermediate transmission ratio between the input shaft 1 and output shaft 3.

Figure 3:
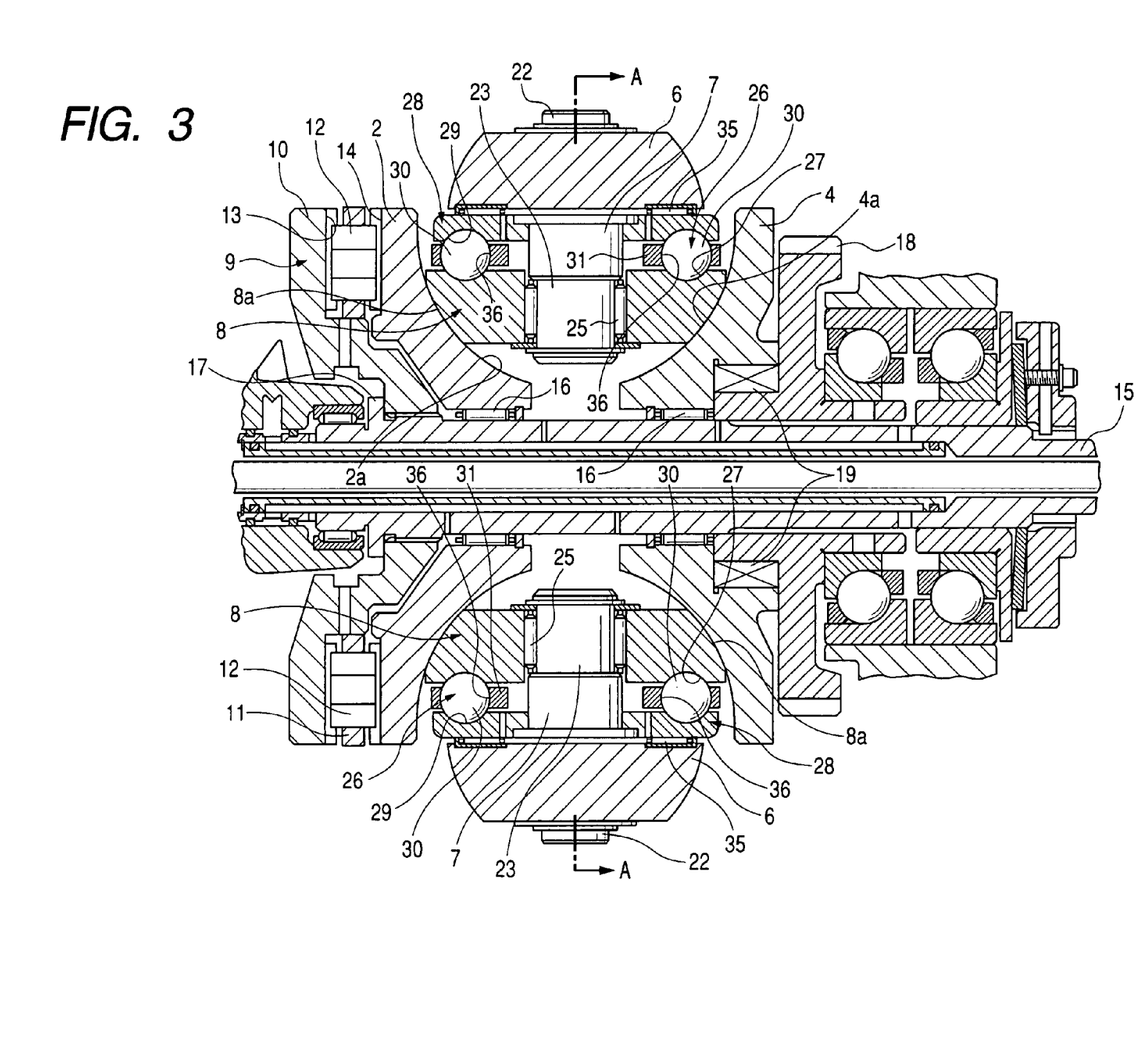
FIG. 3 is a section view of an example of a conventional structure.
Figure 4:
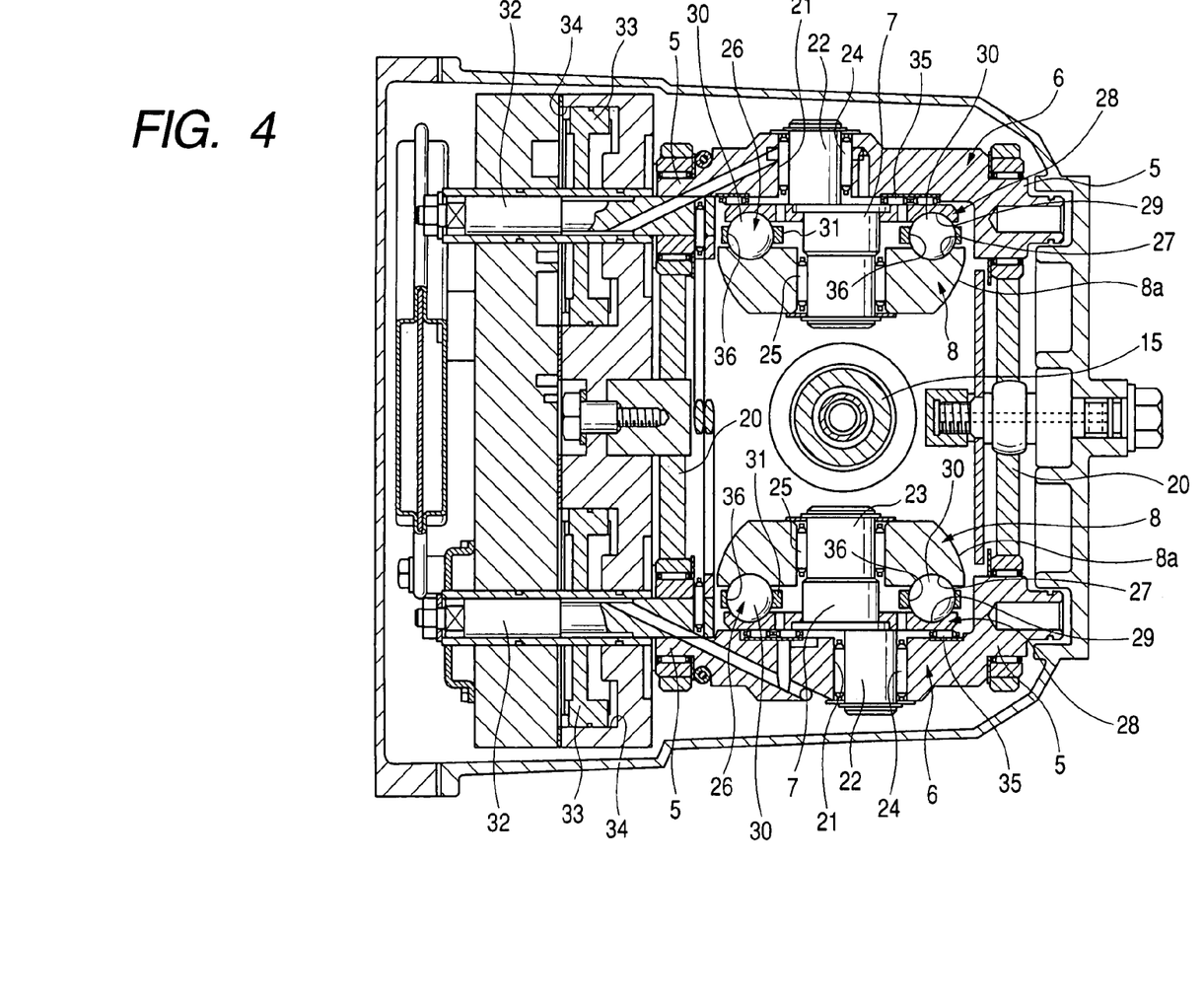
FIG. 4 is a section view taken along the line A—A shown in FIG. 3.

Also, FIGS. 3 and 4 show an example of a more specified structure of a toroidal-type continuously variable transmission which is disclosed in, for example, U.S. Pat. No. 4,955,246. In this structure, an input side disk 2 and an output side disk 4 are rotatably supported through their associated needle roller bearings 16, 16 on the periphery of a circular-pipe-shaped input shaft 15. Also, a cam plate 10 is spline engaged with the outer peripheral surface of the end portion (in FIG. 3, the left end portion) of the input shaft 15, while a flange portion 17 prevents the cam plate 10 from moving in a direction to part away from the input side disk 2. And, the cam plate 10 and rollers 12, 12 cooperate together in constituting a pressing device 9 of a loading cam type which, based on the rotation of the input shaft 15, rotates the input side disk 2 while pressing the same toward the output side disk 4. An output gear 18 is connected to the output side disk 4 using keys 19, 19, so that the output side disk 4 and output gear 18 can be rotated in synchronization with each other.

The respective two-end portions of a pair of trunnions 6, 6 are supported on a pair of support plates 20, 20 in such a manner that they can be swung and also can be shifted in the axial direction (in FIG. 3, in the front and back direction; and, in FIG. 4, in the right and left direction) of their associated pivot shafts 5, 5. And, a pair of displacement shafts 7, 7 are respectively supported on the circular holes 21, 21 portions of the respective trunnions 6, 6. These two displacement shafts 7, 7 respectively include support shaft portions 22, 22 and pivot support shaft portions 23, 23 which are arranged in parallel to each other but are eccentric to each other. Of these portions, the support shaft portions 22, 22 are rotatably supported on the interior sides of their associated circular holes 21, 21 through their associated radial needle roller bearings 24, 24. Also, on the peripheries of the pivot support shaft portions 23, 23, there are rotatably supported power rollers 8, 8 through another radial needle roller bearings 25, 25.

By the way, the pair of displacement shafts 7, 7 are disposed at positions which are 180-degree opposite with respect to the input shaft 15. Also, the direction, in which the pivot support shaft portions 23, 23 of the displacement shafts 7, 7 are eccentric to the support shaft portions 22, 22, is the same direction (in FIG. 4, in the reversed right and left direction) with respect to the rotation direction of the input side and output side disks 2, 4. And, the eccentric direction is a direction which is substantially perpendicular to the mounting direction of the input shaft 15. Therefore, the power rollers 8, 8 are supported in such a manner that they can be slightly shifted with respect to the mounting direction of the input shaft 15. As a result of this, even in case where the power rollers 8, 8 tend to shift in the axial direction (in FIG. 3, in the right and left direction; and, in FIG. 4, in the front and back direction) of the input shaft 15 due to the elastic deformation of these composing parts of the toroidal-type continuously variable transmission caused by large loads applied to these composing parts while the rotation power is in transmission, such shifting movements of the power rollers 8, 8 can be absorbed without applying unreasonable forces to the composing parts.

Also, between the outer end faces of the power rollers 8, 8 and the inner surfaces of the middle portions of the trunnions 6, 6, there are interposed thrust bearings such as thrust ball bearings 26, 26 servings as thrust rolling bearings and thrust needle roller bearings 35, 35 sequentially in the order starting from the outer end faces of the power rollers 8, 8. Of these bearings, the thrust ball bearings 26, 26 allow the power rollers 8, 8 to rotate while supporting thrust-direction loads applied to the power rollers 8, 8. To constitute such thrust ball bearings 26, 26, in the outer end faces of the power rollers 8, 8, there are formed inner raceways 27, 27 each of a deep groove type or of an angular type. Also, in the inner surfaces of outer rings 28, 28 supported on the inner surfaces of the trunnions 6, 6 through the thrust needle roller bearings 35, 35, there are formed outer raceways 29, 29 each of a deep groove type or of an angular type. And, between the outer raceways 29, 29 and inner raceways 27, 27, there are rollably interposed a plurality of balls 30, 30 which serve as rolling elements. These balls 30, 30 are rollably held by their associated retainers 31, 31 in such a manner that they are spaced from one another in the circumferential direction thereof.

Also, the thrust bearings such as the thrust needle roller bearings 35, 35 or sliding bearings, while supporting thrust loads applied from the power rollers 8, 8 to the outer rings 28, 28 constituting the thrust ball bearings 26, 26, allow the pivot support shaft portions 23, 23 and outer rings 28, 28 to swing about their associated support shaft portions 22, 22.

Further, to the one-end portions (in FIG. 4, the left end portions) of the respective trunnions 6, 6, there are connected drive rods 32, 32 respectively; and, to the outer peripheral surfaces of the middle portions of the drive rods 32, 32, there are fixedly secured drive pistons 33, 33 respectively. And, these drive pistons 33, 33 are respectively oil-tight fitted into their associated drive cylinders 34, 34.

In the case of the above-structured toroidal-type continuously variable transmission, the rotation power of the input shaft 15 is transmitted through the pressing device 9 to the input side disk 2. And, the rotation power of the input side disk 2 is transmitted through a pair of power rollers 8, 8 to the output side disk 4 and further the rotation power of the output side disk 4 is taken out from the output gear 18. To change the rotation speed ratio between the input shaft 15 and output gear 18, the pair of drive pistons 33, 33 may be shifted in the mutually opposite directions. As the drive pistons 33, 33 are shifted, the pair of trunnions 6, 6 are shifted in the mutually opposite directions; for example, the power roller 8 situated on the lower side in FIG. 4 is shifted to the right in FIG. 4, while the power roller 8 on the upper side is shifted to the left in FIG. 4. This changes the direction of tangential-direction forces acting on the contact portions between the peripheral surfaces 8a, 8a of the power rollers 8, 8 and the inner surfaces 2a, 4a of the input side disk 2 and output side disk 4. And, as the direction of the tangential-direction forces is changed, the trunnions 6, 6 are respectively swung in the mutually opposite directions about their associated pivot shafts 5, 5 pivotally supported on their associated support plates 20, 20. As a result of this, as is shown in FIGS. 1 and 2, the contact positions between the peripheral surfaces 8a, 8a of the power rollers 8, 8 and the inner surfaces 2a, 4a are caused to change, thereby changing the rotation speed ratio between the input shaft 15 and output gear 18.

By the way, when the rotation power is transmitted between the input shaft 15 and output gear 18 in this manner, the power rollers 8, 8 are shifted in the axial direction of the input shaft 15 due to the elastic deformation of the composing parts, and the displacement shafts 7, 7 pivotally supporting these power rollers 8, 8 are slightly rotated about their associated support shaft portions 22, 22. As a result of the slight rotation of the displacement shafts 7, 7, the outer surfaces of the outer rings 28, 28 of the thrust ball bearings 26, 26 and the inner surfaces of the trunnions 6, 6 are caused to shift with respect to each other. Since the thrust needle roller bearings 35, 35 are interposed between these outer and inner surfaces, the force necessary for the above relative shifting movements may be small. Therefore, there can be used a small force to change the inclination angles of the displacement shafts 7, 7 in the above-mentioned manner.

Also, in the case of the toroidal-type continuously variable transmission structured and operatable in the above-mentioned manner, large forces are easy to be applied to the retainers 31, 31 which constitute the thrust ball bearings 26, 26 for supporting the power rollers 8, 8 in a rotatably manner, which makes it difficult to secure the durability of these retainers 31, 31. The reason for this is that the revolving speeds of the plurality of balls 30, 30 around the thrust ball bearings 26, 26 are caused to vary. Especially, in the case of the thrust ball bearings 26, 26 to be incorporated into a toroidal-type continuously variable transmission, the revolving speeds of the balls 30, 30 around the bearings 26, 26 vary greatly because a toroidal-type continuously variable transmission originally has the following problems I, II.

I. Not only the internal clearances of the radial needle roller bearings 25, 25, which support together with the thrust ball bearings 26, 26 the power rollers 8, 8 in a rotatable manner, are large, but also, when the toroidal-type continuously variable transmission is in operation, thrust loads as well as radial loads are applied to the power rollers 8, 8.

That is, the power rollers 8, 8 are requested to bring their respective peripheral surfaces 8a, 8a into uniform contact with the inner surface 2a of the input side disk 2 and the inner surface 4a of the output side disk 4. For this reason, in order to be able to realize the delicate and quick shifting movements of the power rollers 8, 8, the internal clearances of the radial needle roller bearings 25, 25 are set large. As a result of this, the center axes of the power rollers 8, 8 and the center axes of the outer rings 28, 28 constituting the thrust ball bearings 26, 26 are easy to disagree with each other.

Further, when the toroidal-type continuously variable transmission is in operation, to the power rollers 8, 8, there are applied, as a radial load, a force (a so called 2 Ft traction force) which is applied to the power rollers 8, 8 from the rolling contact portions between the peripheral surfaces 8a, 8a of the power rollers 8, 8 and the inner surfaces 2a, 4a of the input side and output side disks 2, 4. And, due to this radial load, the above-mentioned center axes are caused to disagree with each other.

And, in case where the center axes disagree with each other, the contact angles of the plurality of balls 30, 30 constituting the thrust ball bearings 26, 26 differ from each other. As known well, since the revolving speeds of rolling elements such as balls 30, 30 constituting rolling bearings around the rolling bearings vary according to their contact angles, in case where the angles of the plurality of balls 30, 30 constituting the same thrust ball bearings 26, 26 are different from each other, the revolving speeds of the balls 30, 30 around the thrust ball bearings 26, 26 are caused to differ from each other.

II. The power rollers 8, 8 are elastically deformed unevenly with respect to the circumferential direction thereof. That is, the peripheral surfaces 8a, 8a of the power rollers 8, 8 are contacted with the inner surfaces 2a, 4a of the input side and output side disks 2, 4 at two positions on the opposite sides in the circumferential direction (on the two end sides in the diameter direction), so that the power rollers 8, 8 receive large pressing forces, which go inwardly in the diameter direction, from the two side surfaces 2a, 4a. Due to this, when the toroidal-type continuously variable transmission is in operation, the power rollers 8, 8 are elastically deformed into elliptical shapes. Due to the elastically deformed power rollers 8, 8, the inner raceways 27, 27 constituting the thrust ball bearings 26, 26 are also elastically deformed into elliptical shapes, with the result that the revolving speeds of the balls 30, 30 around the bearings 26, 26 rotating in contact with the inner raceways 27, 27 are caused to differ from each other.

Figure 5:
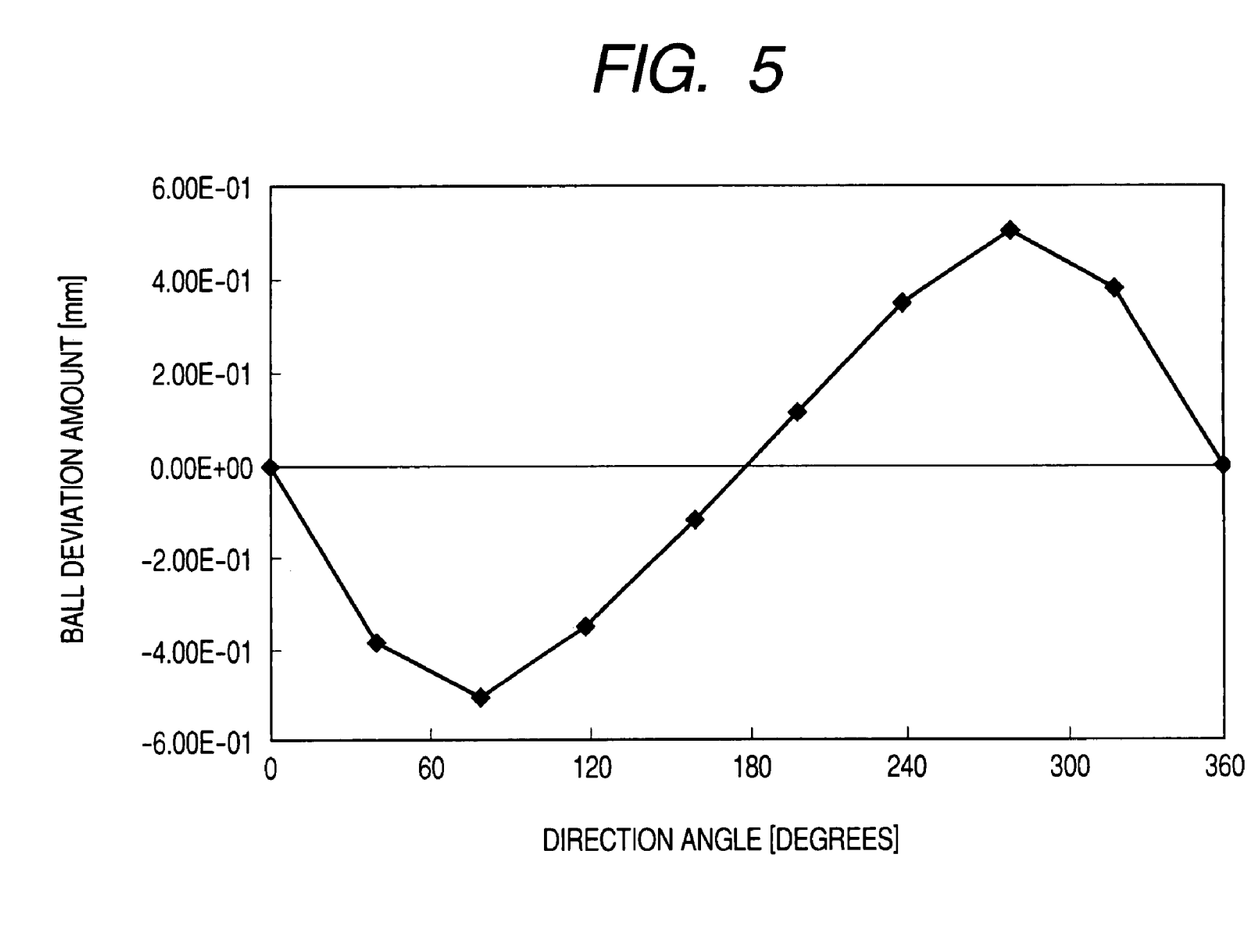
FIG. 5 is a graphical representation of the deviation of the circumferential-direction position of a ball constituting a thrust ball bearing with respect to the reference position thereof; and, FIGS. 6A to 6D is a typical view of a collision state between the inner surface of a pocket formed in a retainer and the rolling surface of a rolling element, showing the operation of the present invention.

At any rate, in the case of the thrust ball bearings 26, 26 which constitute the toroidal-type continuously variable transmission, the revolving speeds of the plurality of balls 30, 30 around the thrust ball bearings 26, 26 are varied and also the degree of the variation is outstandingly large when compared with a rolling bearing of an ordinary type. In case where the revolving speeds of the balls 30, 30 around the thrust ball bearings 26, 26 are different from each other in this manner, the distances between the mutually adjoining balls 30, 30 in the circumferential direction thereof are caused to vary. Here, FIG. 5 shows how the circumferential-direction positions (direction angles) of the balls 30, 30 constituting the thrust ball bearings 26, 26 are shifted when compared with the reference positions (the positions when the revolving speeds of the balls 30, 30 around the thrust ball bearings 26, 26 are assumed that they are not varied but are constant). As can be seen clearly from FIG. 5, the revolving speeds of the balls 30, 30, which constitute the thrust ball bearings 26, 26, around the thrust ball bearings 26, 26 may be increased or decreased according to their circumferential-direction positions.

As described above, in case where the revolving speeds of the balls 30, 30, which constitute the thrust ball bearings 26, 26, around the thrust ball bearings 26, 26 are varied, the rolling surfaces of these balls 30, 30 interfere with the retainer 31, so that a force is applied to this retainer 31. As a result of this, a bending stress is repeatedly applied to part of the retainer 31 and, therefore, as the bearings are used for a long period of time, there is a possibility that there can occur damage such as a crack in the retainer 31. In case where the retainer 31 is omitted, the rolling surfaces of the balls 30, 30 adjoining each other in the circumferential direction are contacted with each other and thus the rolling surfaces of the balls 30, 30 shifting in the mutually opposite directions are strongly rubbed against each other, which results in the increased torque loss. Therefore, it is impossible to employ the structure in which the retainer 31 is omitted.

In view of the above-mentioned circumstances of the above-cited toroidal-type continuously variable transmission, in U.S. Pat. No. 6,368,245, there is disclosed a structure in which clearances between the inner surfaces of retainer pockets and the rolling surfaces of balls are increased to thereby prevent these two surfaces from interfering with each other regardless of variations in the revolving speeds of the balls. Also, in JP-A-2001-50360, there is disclosed a structure in which, between balls adjoining each other in the circumferential direction thereof, there are interposed elements which constitute a separator and are independent of each other, thereby preventing the rolling surfaces of the balls adjoining each other in the circumferential direction thereof from being contacted with each other.

As disclosed in U.S. Pat. No. 6,368,245, in the case of the structure in which the clearances between the inner surfaces of the pockets of the retainer and the rolling surfaces of the balls are increased, there increase vibrations which are generated when a toroidal-type continuously variable transmission is operated on the speed increasing side. That is, the sizes of the above clearances are set according to a state where the toroidal-type continuously variable transmission is operated on the speed reducing side in which the variations in the revolving speeds of the balls around their associated bearings increase. Therefore, in case where the toroidal-type continuously variable transmission is operated on the speed increasing side, the above clearances are excessively large and thus the retainer is easy to vibrate. And, when the retainer vibrates, not only the vibration itself generates a strange sound but also, with the vibration of the retainer, the inner surface of the retainer pockets and the rolling surfaces of the balls are heavily collided with each other, thereby raising a possibility that the durability of the thrust ball bearings 26, 26 including the power rollers 8, 8.

Now, With reference to FIGS. 6A to 6D, description will be given below of the fact that the durability of the thrust ball bearings 26, 26 of a toroidal-type continuously variable transmission including this retainer is influenced by the sizes of the clearances between the inner surfaces of the pockets of the retainer and the rolling surfaces of the balls.

Figure 6A:
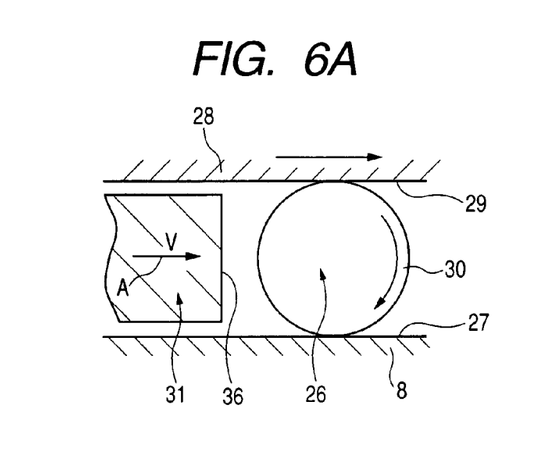

Firstly, FIG. 6A shows a state in which, between an inner raceway 27 formed in the outer end face of the power roller 8 and an outer raceway 29 formed in the inner surface of an outer ring 28 not only the balls 30 serving as rolling elements rotate around the bearing while rotating about their own axes, but also the retainer 31 holding the balls 30 in their associated pockets 36 rotates without being contacted with these balls 30.

Figure 6B:
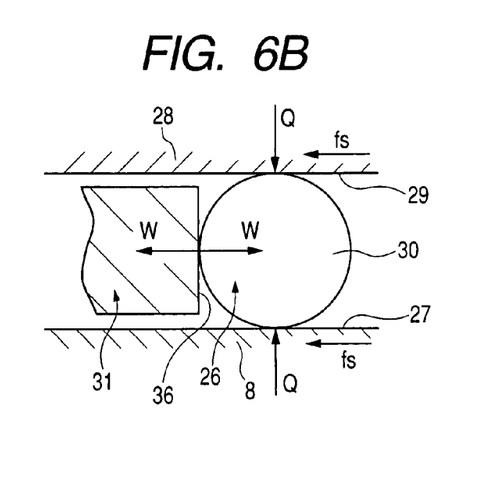

Next, FIG. 6B shows a state in which there is generated a difference between the revolving speeds of the balls 30 around the bearing and the rotation speed of the retainer 31, with the result that the rolling surfaces of the balls 30 and the inner surfaces of the pockets 36 are collided with each other. In this state, to these two surfaces, there are applied forces (collision forces) which are generated by the collision and respectively have a value of W. On the other hand, it is believed that, to each of the balls 30, there is applied a friction force $f_s$ based on the rolling element load Q of this ball 30. In case where the collision force W is equal to or less than the friction force $f_s$ (W≦$f_s$), regardless of the above collision, the ball 30 is allowed to roll on without causing the contact portion between the rolling surface of the ball 30 and the above-mentioned inner raceway 27 and outer raceway 29 to slip. On the other hand, in case where the collision force W exceeds the friction force $f_s$ (W>$f_s$), the ball 30 rolls while causing the contact portion between the rolling surface of the ball 30 and the above-mentioned inner raceway 27 and outer raceway 29 to slip. Such revolution of the ball 30 around the bearing with such slippage increases the amount of heat to be generated in the contact portion between the rolling surface of the ball 30 and the inner raceway 27 and outer raceway 29. As a result of this, not only the rolling resistance of the thrust rolling bearing such as the thrust ball bearing 26 increases to thereby lower the efficiency of the toroidal-type continuously variable transmission but also the durability of the ball rolling surface and the respective raceways 27, 29 is lowered.

Figure 6C:
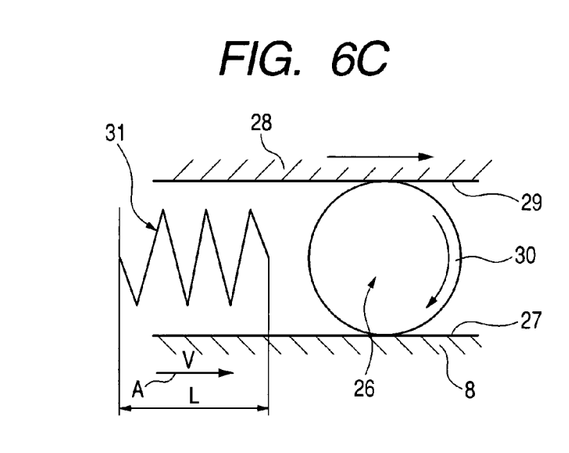
Figure 6D:
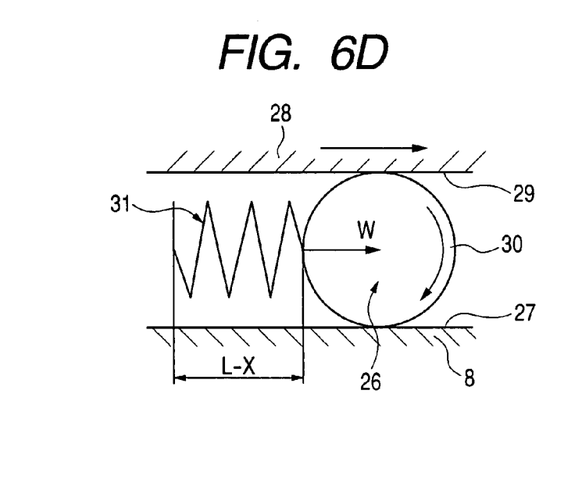

Next, let us conduct a further examination of the size of the collision force W. It is assumed here that the rotation speed of the retainer 31 becomes faster than the revolving speed of the ball 30 around the bearing; and thus, the inner surface of the pocket of the retainer 31, as shown by an arrow mark A in FIG. 6A, approaches the rolling surface of the ball 30 at a relative speed (collision speed) v and these two surfaces are collided with each other. In such collision, it is believed that the inner surface portion of the pocket 36 of the retainer 31, as shown in FIGS. 6C, 6D, functions as a spring and supports the kinetic energy due to its own rigidity to thereby generate the collision force W. The kinetic energy to be converted into the collision force W by the inner surface portion of the pocket 36 in this manner can be expressed by an equation, that is, m·v²/2, where the mass of the retainer 31 is expressed as m.

Also, the energy that is opposed to the collision force W due to the rigidity of the retainer 31 can be expressed by the following equation: that is, k·x²/2, where the spring constant of the retainer 31 is expressed as k and a flex amount caused by the collision is expressed as x.

When the collision force W is viewed from the retainer 31 side, because W=k·x, there can be obtained k·x²/2=W²/2k.

Also, according to the law of the conservation of energy, there can be obtained the following equation:

That is, W²/2k=m·v²/2

$$W = (m \cdot k)^{\frac{1}{2}} \cdot v.$$

This equation shows that, as the mass m and rigidity (spring constant k) of the retainer increase, and also as the collision speed v between the inner surface of the pocket 36 and the rolling surface of the ball 30 increase, the collision force w increases.

Also, of the above components, the collision speed v can be expressed by the acceleration α of the retainer 31 with respect to the ball 30 and the size of a clearance C between the rolling surface of the ball 30 and the inner surface of the pocket 36 of the retainer 31: that is, $$v = (2\alpha \cdot C)^{\frac{1}{2}}.$$

From this equation, it can be found that, as the clearance C increases, the collision speed increases and the collision force W increases. Also, this fact shows that, as disclosed in the above-cited U.S. Pat. No. 6,368,245, in case where the clearance between the rolling surface of the ball 30 and the inner surface of the pocket 36 of the retainer 31 is increased, the vibrations to be generated when the toroidal-type continuously variable transmission is operated in a speed increasing mode and the play of the retainer 31 with respect to the ball 30 increases are increased; and thus, in case where no countermeasure is enforced, the durability of the thrust ball bearing can be lowered.

On the other hand, in the case of the structure disclosed in the above-cited JP-A-2001-50360, it is difficult to stabilize the attitudes of the respective elements constituting the separator and thus it is also difficult to restrict the generation of the vibrations in the thrust ball bearings 26, 26 portions of the structure when the toroidal-type continuously variable transmission in operation.

As a technique for preventing the damage of the retainer that is caused by variations in the revolving speeds of the balls around the bearings, there is further known a structure disclosed in JP-A-2001-254792. However, this structure also has similar problems to the above-cited structures.

SUMMARY OF THE INVENTION

The present invention aims at eliminating the drawbacks found in the above-mentioned conventional toroidal-type continuously variable transmissions. Accordingly, it is an object of the present invention to provide a continuously variable transmission which uses an integrally-formed retainer and, even in case where clearances between the inner surfaces of the pockets of the retainer and the rolling surfaces of balls are increased, can secure the durability of a thrust rolling bearing including the retainer.

In attaining the above object, according to the present invention, there is provided a toroidal-type continuously variable transmission, having: first and second disks respectively including inner surfaces and supported so as to be concentric with each other and be rotated with respect to each other, respective inner surfaces thereof being opposed to each other; a plurality of trunnions each swingable about a pair of pivot shafts, the pivot shafts being respectively disposed at positions twisted with respect to a center axes of the first and second disks and being concentric with each other; a plurality of displacement shafts respectively supported on associated trunnions, respective partial portions thereof are projected from an inner surfaces of the associated trunnions; a plurality of power rollers respectively interposed between and held by the first and second disks so as to be rotatably supported on the partial portions of the associated displacement shafts projected from the inner surfaces of the trunnions; and, a plurality of thrust bearings respectively interposed between the outer end faces of associated power rollers and the inner surfaces of associated trunnions for supporting thrust loads applied to the power rollers, each of the thrust bearings including an outer ring, an inner raceway formed in the outer end face of the power roller, an outer raceway formed in the inner surface of the outer ring, a plurality of rolling elements rollably interposed between the inner raceways and outer raceways, and a circular-ring-shaped retainer for holding the rolling elements in a freely rollable manner, wherein, in case where the density of a retainer material constituting the retainer is expressed as $\rho_d$, the elastic modulus of the retainer material is expressed as $E_d$, the density of rolling element materials respectively constituting the associated rolling elements is expressed as $\rho_c$ and the elastic modulus of the rolling element materials is expressed as $E_c$, $$\{(\rho_d \cdot E_d)/(\rho_c \cdot E_c)\}^{\frac{1}{2}} \leq 0.6$$

is satisfied.

That is, a toroidal-type continuously variable transmission according to the present invention, similarly to the previously described conventional toroidal-type continuously variable transmission, comprises first and second disks, a plurality of trunnions, a plurality of displacement shafts, a plurality of power rollers, and a plurality of thrust rolling bearings.

Of these composing elements, the first and second disks are supported with their respective inner surfaces opposed to each other in such a manner that they are concentric with each other and can be rotated independently of each other.

Also, the trunnions can be respectively swung about the centers of a pair of pivot shafts which are disposed at positions twisted to the center axes of the first and second disks and are concentric with each other.

The displacement shafts are respectively supported on their associated trunnions in such a manner that they are in part projected from the inner surfaces of their associated trunnions.

And, the power rollers are interposed between and held by the first and second disks in such a manner that they are rotatably supported on the peripheries of such portions of the displacement shafts as projected from the inner surfaces of their associated trunnions.

Further, the thrust rolling bearings are interposed between the outer end faces of the power rollers and the inner surfaces of the trunnions for supporting the thrust loads that are applied to the power rollers.

And, each of the thrust rolling bearings comprises an inner raceway formed in the outer end face of its associated power roller, an outer raceway formed in the inner surface of an outer ring supported on the inner surface of its associated trunnion, and a plurality of rolling elements rollably interposed between the inner raceways and outer raceways, and a circular-ring-shaped retainer for holding the rolling elements in a rollable manner.

Especially, a toroidal-type continuously variable transmission according to the present invention can satisfy the following equation: that is, $$\{(\rho_d \cdot E_d)/(\rho_c \cdot E_c)\}^{\frac{1}{2}} \leq 0.6,$$

where the density of a retainer material constituting the retainer is expressed as $\rho_d$, the elastic modulus of the retainer material is expressed as $E_d$, the density of a rolling element material constituting the rolling element is expressed as $\rho_c$, and the elastic modulus of the rolling element material is expressed as $E_c$.

According to the above-structured toroidal-type continuously variable transmission of the present invention, there is used an integrally-formed retainer and, even in case where the clearances between the inner surfaces of the pockets and the rolling surfaces of the rolling elements are increased, the durability of the thrust rolling bearing including the retainer can be secured.

That is, since the relationships between the density of the material of the retainer $\rho_d$, the elastic modulus of the retainer material $E_d$, the density of the material of the rolling element as $\rho_c$, and the elastic modulus of the material of the rolling element $E_c$ are set by the following equation, that is, $$\{(\rho_d \cdot E_d)/(\rho_c \cdot E_c)\}^{\frac{1}{2}} \leq 0.6,$$

it is possible to restrict a collision force which can occur in the contact portion between the inner surface of the pocket of the retainer and the rolling surface of the rolling element, thereby being able to secure the durability of the thrust rolling bearing including the retainer. The reason for this will be discussed below.

Firstly, the mass m of a certain member, that is, a retainer or a rolling element can be expressed by the following equation: that is, $m = \rho \cdot V$, where the density of a material constituting the present member is expressed as $\rho$ and the volume of the material is expressed as V. In case where the shape of the present member is the same, there is obtained the following relation: that is, $m \propto \rho$.

For the rigidity k of the present member as well, in case where the shape of the present member is the same, using the elastic modulus E of the material constituting the present member, there is obtained the following relation: that is, $k \propto E$.

Also, on the assumption that the operating state is the same, it is believed that the relative speed v between two certain members, that is, a retainer and a rolling element is constant; and, therefore, the collision force W can be expressed in the following manner: that is, $$W \propto (\rho \cdot E)^{\frac{1}{2}}.$$

Here, the inventors made a test in order to know the influences of the different materials of the retainer on the durability of the thrust ball bearing. Specifically, the inventors prepared a plurality of kinds of retainers 31 using materials differing in the value of $$(\rho \cdot E)^{\frac{1}{2}}$$

having an influence on the collision force W which are the same in shape and dimension and also in which clearances between the pocket inner surfaces and ball rolling surfaces are set large to such a degree that no interference can occur (due to the difference between the rotation speeds of the retainers 31 and the revolving speed of the balls 30 around their associated thrust ball bearings) between these surfaces even on the speed reducing side where the difference between the rotation speeds of the retainers 31 and the revolving speed of the balls 30 around their associated thrust ball bearings becomes the largest; and, in order to know the influences of the different materials on the durability of the thrust ball bearings 26 including these retainers 31, the inventors conducted the above test on the speed increasing side where the clearances between the pocket inner surfaces and ball rolling surfaces become excessively large. And, based on this test, the inventors found the above-mentioned condition, that is, $$\{(\rho_d \cdot E_d)/(\rho_c \cdot E_c)\}^{\frac{1}{2}} \le 0.6.$$

Tables 1 and 2 show the conditions and results of this test.

retainer materials constituting the retainer 31 and the elastic modulus $E_d$ of the retainer materials vary as shown in Tables 1 and 2.

As can be seen clearly from the above-mentioned tables 1 and 2 which show the results of the test conducted under the above conditions, in case where the density $\rho_d$ of the retainer material constituting the retainer 31, the elastic modulus $E_d$ of the retainer material, the density $\rho_c$ of the rolling element materials constituting the balls 30 and the elastic modulus $E_c$ of the rolling element materials are restricted in such a manner that they can satisfy $$\{(\rho_d \cdot E_d)/(\rho_c \cdot E_c)\}^{\frac{1}{2}} \le 0.6,$$

the durability of the thrust ball bearing 26 including the above retainer 31 can be secured.

TABLE 1

|  | Iron | Brass (HB$_s$C1) | Ti alloy | Al alloy (Duralumin) | Mg alloy |
|---|---|---|---|---|---|
| Density $\rho$ (g/cm$^3$) | 7.9 | 8.5 | 5 | 2.7 | 1.7 |
| Elastic modulus E(MPa) | 200009.8 | 102900 | 100000 | 70560 | 44100 |
| $\rho \cdot E$ | 1580077.42 | 874650 | 500000 | 190512 | 74970 |
| $(\rho \cdot E)/(\rho \cdot E)$steel | 1.000 | 0.554 | 0.316 | 0.121 | 0.047 |
| $\{(\rho \cdot E)/(\rho \cdot E)$steel$\}^{\frac{1}{2}}$ | 1.000 | 0.744 | 0.563 | 0.347 | 0.218 |
| Durability test results | Flaking in 154 hrs. | Flaking in 196 hrs. | No problem after 250 hrs | No problem after 250 hrs | No problem after 250 hrs |
| State of pocket inner surface of retainer after durability test | Seizure and wear were found. | Seizure and wear were found. | Slight wear was found. | Slight wear was found. | Slight wear was found. |
| Judgment | No good | No good | Good | Good | Good |

|  | PA66 (GF25%) | PEEK (Not reinforced) | PEEK (CF30%) | PPS (CF15%) | PPS (CF30%) | PA46 (Not reinforced) | PA46 (GF30%) | PI (CF added) |
|---|---|---|---|---|---|---|---|---|
| Density $\rho$ (g/cm$^3$) | 1.3 | 1.32 | 1.48 | 1.39 | 1.48 | 1.18 | 1.41 | 1.43 |
| Elastic modulus E(MPa) | 5782 | 4200 | 20200 | 12000 | 19000 | 3200 | 8500 | 22540 |
| $\rho \cdot E$ | 7516.6 | 5544 | 29896 | 16680 | 28120 | 3776 | 11985 | 32232.2 |
| $(\rho \cdot E)/(\rho \cdot E)$steel | 0.005 | 0.004 | 0.019 | 0.011 | 0.018 | 0.002 | 0.008 | 0.020 |
| $\{(\rho \cdot E)/(\rho \cdot E)$steel$\}^{\frac{1}{2}}$ | 0.069 | 0.059 | 0.138 | 0.103 | 0.133 | 0.049 | 0.087 | 0.143 |
| Durability test results | No problem after 250 hrs | No problem after 250 hrs | No problem after 250 hrs | No problem after 250 hrs | No problem after 250 hrs | No problem after 250 hrs | No problem after 250 hrs | No problem after 250 hrs |
| State of pocket inner surface of retainer after durability test | Seizure and wear were not found. | Seizure and wear were not found. | Seizure and wear were not found. | Seizure and wear were not found. | Seizure and wear were not found. | Seizure and wear were not found. | Seizure and wear were not found. | Seizure and wear were not found. |
| Judgment | Very good | Very good | Very good | Very good | Very good | Very good | Very good | Very good |

Of these tables 1 and 2, Table 1 shows a case where the material of the retainer is metal, whereas Table 2 shows a case where the material of the retainer is synthetic resin. Also, the materials of the balls 30 (rolling elements) are all iron. Therefore, the values of the products ($\rho_c \cdot E_c$) of the densities $\rho_c$ of rolling element materials constituting the rolling elements and the elastic modulus $E_c$ of the rolling element materials, in any case, are [1580077.42] which is shown in the column of iron in Table 1. On the other hand, the values of the products ($\rho_d \cdot E_d$) of the densities $\rho_d$ of the That is, in case where the retainer 31 was made of iron or brass having a large product ($\rho_d \cdot E_d$) of the density $\rho_d$ and elastic modulus $E_d$ and was then combined with a ball 30 made of iron, there is obtained $$\{(\rho_d \cdot E_d)/(\rho_c \cdot E_c)\}^{\frac{1}{2}} > 0.7,$$

with the result that sufficient durability could not be obtained neither in the inner surface of the pocket 36 nor in the inner raceway 27 and outer raceway 29.

On the other hand, in case where the retainer 31 was made of a titanium (Ti) alloy, an aluminum (Al) alloy (duralumin) and a magnesium (Mg) alloy, $$\{(\rho_d \cdot E_d)/(\rho_c \cdot E_c)\}^{\frac{1}{2}} \leq 0.6,$$

could be satisfied, with the result that practically necessary durability could be obtained not only in the inner surface of the pocket 36 but also in the inner raceway 27 and outer raceway 29. That is, in this case, sufficient durability could be obtained in the inner raceway 27 and outer raceway 29 and, in the case of the inner surface of the pocket 36 as well, there occurred only slight wear.

Further, in case where the retainer 31 is made of polyamide (PA) 66, polyether ether ketone (PEEK), glass-fiber-reinforced polyether ether ketone, carbon-fiber-reinforced polyphenylene sulfide (PPS), polyamide 46, glass-fiber-reinforced polyamide 46, and carbon-fiber-reinforced polyimide (PI), $$\{(\rho_d \cdot E_d)/(\rho_c \cdot E_c)\}^{\frac{1}{2}} \leq 0.2,$$

(in the case of the test example, 0.15) was satisfied, with the result that there could be obtained practically necessary durability not only in the inner surface of the pocket 36 but also in the inner raceway 27 and outer raceway 29. That is, in this case, not only sufficient durability could be obtained in the inner raceway 27 and outer raceway 29 but also neither seizure nor wear occurred in the inner surface of the pocket 36.

As can be seen clearly from the test the conditions and results of which are shown in the above-mentioned tables 1 and 2, in case where the density $\rho_d$ of the retainer material constituting the retainer 31, the elastic modulus $E_d$ of the retainer material, the density $\rho_c$ of the rolling element materials constituting the balls 30 and the elastic modulus $E_c$ of the rolling element materials are restricted in such a manner that they can satisfy $$\{(\rho_d \cdot E_d)/(\rho_c \cdot E_c)\}^{\frac{1}{2}} \leq 0.6,$$

the durability of the thrust ball bearing 26 including the above retainer 31 can be secured to a practically sufficient degree. Further, in case where they are restricted in such a manner that $$\{(\rho_d \cdot E_d)/(\rho_c \cdot E_c)\}^{\frac{1}{2}} \leq 0.2,$$

can be satisfied, there can be more excellent durability.

By the way, in the above-mentioned test, as the rolling element, there was used a ball 30 which is made of iron (bearing steel). However, not only in case where the rolling element is a conical roller made of iron but also in case where the rolling element is a ball or a conical roller made of ceramic, the above-mentioned fact can also apply similarly: that is, in case where the relationship between the density $\rho_d$ of the retainer material, the elastic modulus $E_d$ of the retainer material, the density $\rho_c$ of the rolling element materials and the elastic modulus $E_c$ of the rolling element materials is restricted in such a manner that it can satisfy $$\{(\rho_d \cdot E_d)/(\rho_c \cdot E_c)\}^{\frac{1}{2}} \leq 0.6,$$

there can be obtained excellent durability.

DETAILED DESCRIPTION OF THE PREFEREED EMBODIMENTS

The present invention is characterized in that, in order to secure the durability of the thrust rolling bearings such as the thrust ball bearings 26, 26 which are used to support the power rollers 8, 8 on the inner surfaces of the trunnions 6, 6 in such a manner that they can be rotated, the characteristic values of the retainer 31 to be incorporated into the thrust rolling bearing is restricted in connection with the characteristic values of the rolling element such as the ball 30. The structure of the toroidal-type continuously variable transmission of the present invention to be illustrated in its associated drawings is similar to conventional toroidal-type continuously variable transmissions disclosed in many publications such as patent publications including the structure shown in the previously discussed FIGS. 3 and 4. Therefore, in the case of the specific structure of a toroidal-type continuously variable transmission according to the present invention, the duplicate illustration and description thereof are omitted here.

Since the present invention is structured and operates in the above-mentioned manner, the present invention can realize a toroidal-type continuously variable transmission which is excellent in transmission efficiency and durability.

What is claimed is:

1. A toroidal-type continuously variable transmission, comprising:

first and second disks respectively including inner surfaces and supported so as to be concentric with each other and be rotated with respect to each other, respective inner surfaces thereof being opposed to each other;

a plurality of trunnions each swingable about a pair of pivot shafts, the pivot shafts being respectively disposed at positions twisted with respect to a center axes of the first and second disks and being concentric with each other;

a plurality of displacement shafts respectively supported on associated trunnions, respective partial portions thereof are projected from an inner surfaces of the associated trunnions;

a plurality of power rollers respectively interposed between and held by the first and second disks so as to be rotatably supported on the partial portions of the associated displacement shafts projected from the inner surfaces of the trunnions; and, a plurality of thrust bearings respectively interposed between the outer end faces of associated power rollers and the inner surfaces of associated trunnions for supporting thrust loads applied to the power rollers, each of the thrust bearings including an outer ring, an inner raceway formed in the outer end face of the power roller, an outer raceway formed in the inner surface of the outer ring, a plurality of rolling elements rollably interposed between the inner raceways and outer raceways, and a circular-ring-shaped retainer for holding the rolling elements in a freely rollable manner, wherein, in the case where the density of a retainer material constituting the retainer is expressed as $\rho_d$, the elastic modulus of the retainer material is expressed as $E_d$, the density of rolling element materials respectively constituting the associated rolling elements is expressed as $\rho_c$ and the elastic modulus of the rolling element materials is expressed as $E_c$, $$\{(\rho_d \cdot E_d)/(\rho_c \cdot E_c)\}^{\frac{1}{2}} \leq 0.6 \text{ is satisfied.}$$

* * * * *